United States Patent

Shindo

[11] Patent Number: 5,155,516
[45] Date of Patent: Oct. 13, 1992

[54] VIEW FINDER OPTICAL SYSTEM WITH EYE DIRECTION DETECTION DEVICE

[75] Inventor: Osamu Shindo, Tokyo, Japan

[73] Assignee: Asahi Kogaku Kogyo Kabushiki Kaisha, Tokyo, Japan

[21] Appl. No.: 599,440

[22] Filed: Oct. 18, 1990

[30] Foreign Application Priority Data

Oct. 19, 1989 [JP] Japan .................. 1-272399

[51] Int. Cl.⁵ ........................... G03B 13/06
[52] U.S. Cl. ................... 354/219; 354/225; 351/210; 359/600
[58] Field of Search ............ 354/219, 224, 225, 62; 350/579; 351/210, 206, 211

[56] References Cited

U.S. PATENT DOCUMENTS

| | | | |
|---|---|---|---|
| 2,381,101 | 8/1945 | Bausch | 350/579 |
| 3,738,238 | 6/1973 | Hager | 354/219 |
| 3,842,431 | 10/1974 | Sakuma | 354/287 |
| 4,264,123 | 4/1981 | Mabie | 350/579 |
| 4,381,892 | 5/1983 | Someya | 354/287 |
| 4,523,818 | 6/1985 | Lang et al. | 350/579 |
| 4,576,593 | 3/1986 | Miura et al. | 354/287 |
| 4,630,903 | 12/1986 | Jones | 350/579 |

FOREIGN PATENT DOCUMENTS 1241511 9/1989 Japan .

Primary Examiner—A. A. Mathews
Attorney, Agent, or Firm—Sandler, Greenblum & Bernstein

[57] ABSTRACT

A view finder optical system including a window of an eye piece portion comprising an eye cup having a contact surface, a shape of the contact surface being made so as to incline an axis of the lens with respect to an axis of the eye piece. The shape of the contact surface is curved corresponding to the lens's shape. The contact surface is made so as to conform to a lens of glasses.

9 Claims, 2 Drawing Sheets

VIEW FINDER OPTICAL SYSTEM WITH EYE DIRECTION DETECTION DEVICE

FIELD OF THE INVENTION

This invention relates to a view finder optical system, particularly a view finder optical system with an eye cup mounted on a window of the eye piece portion of a camera.

BACKGROUND OF THE INVENTION

Heretofore, an eye cup is mounted on a window of the eye piece portion of a view finder optical system of a camera. This eye cup is used to cut light coming from around the window of the eye piece portion, thus a user can see an image at the screen clearly through the view finder optical system. And also, the light coming into the camera's main optical system is cut by the eye cup being in contact with the eye. Thus, the camera's main optical system is not disturbed by the light.

However, some of the users wear glasses when viewing an object. The eye cup has a contact surface with a shape that is only made in accordance with the eye.

That is, the shape of the contact surface is not made in accordance with the shape of the lens of the glasses. Thus, a clearance exists between the lens and the contact surface. When a man puts on the glasses to take a photograph, light coming through the clearance is reflected by the face of the lens, then the light enters the camera's main optical system through the window of the eye piece portion.

SUMMARY OF THE INVENTION

It is therefore an object of the present invention to provide a view finder optical system suitable for a user that is wearing glasses.

Another object is to provide a view finder optical system that reduces light coming from around the window of the eye piece portion of a camera, when a man wearing glasses takes a photograph.

A further object is to provide a view finder suitable for a camera incorporating an eye direction detecting device. This camera has a projection optical system for projecting a parallel light to the man's eye through an eye piece, and the device detects a reflection light from the eye.

For achieving the aforementioned objects, the view finder optical system, according to the present invention, includes a window of an eye piece portion to which is mounted an eye cup, whose contact surface is formed for the lens of the glasses. The shape of the contact surface is made so as to incline the said lens of the glasses with respect to the axis of the eye piece.

According to the present invention, a user that is wearing glasses can see the image at the screen clearly through the view finder. And also, the light coming into the camera's main optical system is reduced by the eye cup. Thus, the camera's main optical system is not disturbed by the light, even if the man takes a photograph with his glasses on.

DRAWING

DESCRIPTION OF PREFERRABLE EMBODIMENT

Figure 1:
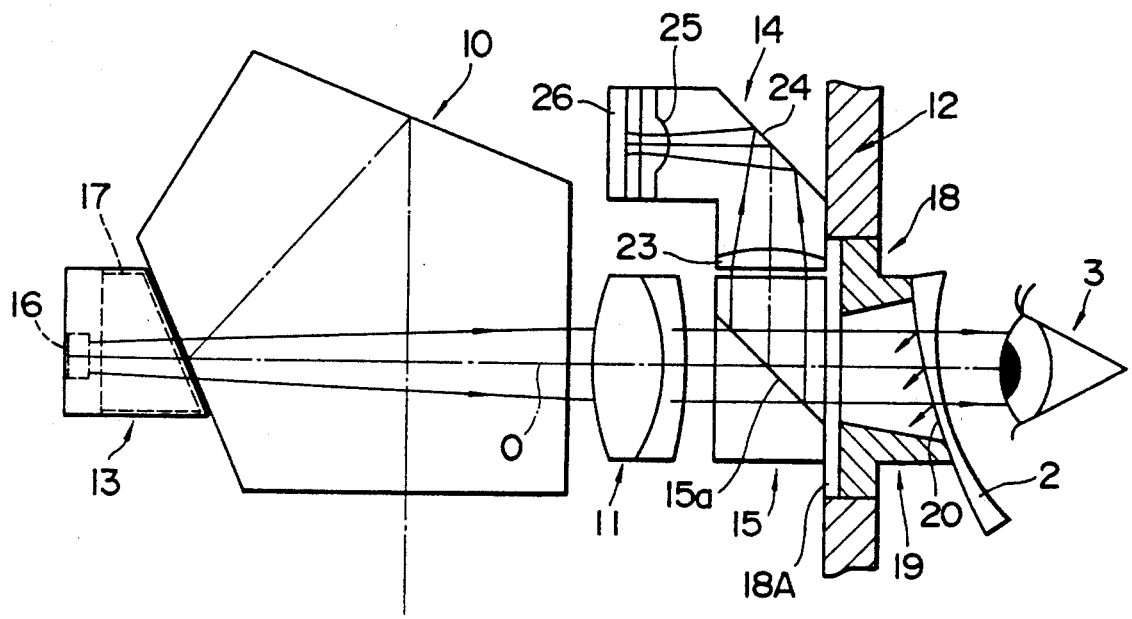
FIG. 1 is an optical system of a camera mounting an eye direction detecting device. The device has a projection optical system for projecting a parallel light to the man's eye through an eye piece.

In FIG. 1, the numeral 10 denotes a pentaprism; the numeral 11 an eye piece; the numeral 12 a frame of a camera; the numeral 13 a projection optical system of an eye direction detecting device; the numeral 14 a receiving optical system of an eye direction detecting device; the numeral 15 a beamsplitter. An axis of the projection optical system 13 is partially coaxial with an axis ○ of the eye piece 11 of the view finder optical system.

The projection optical system 13 has a light source 16 and a prism 17 used as a compensator. The light source 16 emits an infrared, which is guided to the eye piece 11 through the prisms 17,10, after which it becomes a parallel ray by the eye piece 11. The parallel ray reaches a window 18 of the eye piece portion. The window 18 is comprised of an opening 18A formed in the frame 12, and of an eye cup 19 mounted in the opening 18A. The eye cup 19 has a contact surface 20.

The contact surface 20 is curved so as to incline the lens 2 downward; thus the axis of lens 2 is obliqued with respect to the axis ○ of the eye piece 11.

Figure 2:
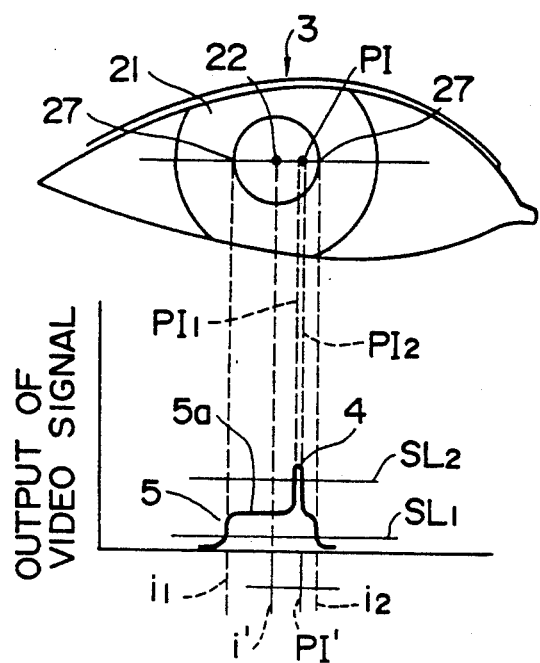
FIG. 2 is a schematic view for obtaining the direction of an eye axis from the first Purkinje image and the center of a pupil by arithmetical operations.

The parallel ray passing through the eye cup 11 is guided to an eye 3. A first Purkinge image PI is made on a cornea 21 of the eye 3 by the parallel ray as shown in FIG. 2. A part of the parallel ray is reached on the retina through the cornea 21. If a relation of the position of the first Purkinje image and a position of the center of the pupil is obtained, a revolving angle is calculated from the relation of the position of the first Purkinje image and the position of the center of the pupil. This is described in detail at page 33, line 10 through page 37, line 6 of co-pending and commonly assigned U.S. patent application Ser. No. 07/520,970, filed May 9, 1990 which is a continuation of now abandoned U.S. application Ser. No. 07/374,564, which is a continuation of U.S. application Ser. No. 152,359. The entire disclosure of U.S. patent application Ser. No. 07/520,970 is expressly incorporated herein by reference.

The parallel ray is reflected on the cornea 21 and the retina. The reflection light from the retina and the cornea 21 is guided to the beam splitter 15 through the eye cup 19. The reflection light is reflected by a mirror plane 15a of the beam splitter 15, after which the reflection light is guided to the receiving optical system 14.

The receiving optical system 14 comprises a relay lens 23, a mirror 24, a re-image lens 25 and a receiving element 26. In this embodiment, the receiving element 26 is a line sensor. The reflection light from the retina makes a contour of a shadow, as an image of the pupil edge. The images of the pupil edges 27 are made on the line sensor 26 based on the reflection light from the retina. Also, the first Purkinje image PI is made on the line sensor 26 based on the reflection light from the cornea 21. The line sensor 26 outputs a video signal 5 as shown in FIG. 2. The video signal 5 has the peak 4 corresponding to the first Purkinje image PI and an almost flat portion 5a corresponding to the reflection light from the retina.

One slice level SL1 is prepared in order to calculate the center 22 of the pupil. That is, the coordinates i 1, i 2 corresponding to the pupil edges 27, respectively, are obtained by the slice level SL1. Another slice level SL2 is prepared in order to calculate the center of the first Purkinje image PI. That is, the coordinates PI1, PI2 corresponding to the first Purkinje image PI are obtained by the slice level SL2. The signal processor (not shown) calculates the central coordinate i', corresponding to the center 22, and the central coordinate PI' corresponding to the center of the first Purkinje image PI, based on the known formula, allowing the user to know the revolution of the eye as mentioned above.

A part of the parallel ray through the eye cup 19 is reflected on a face of the lens 2, and the reflection light from the lens 2 returns to the beam splitter 15. However, most of the reflection light from the lens 2 is reflected downward, because the lens 2 touches the contact surface 20 so as to incline downward. Thus the video signal is not disturbed and the device detects the direction of the eye axis correctly. For example, the camera is a single lens reflex camera which has a plurality of optical focus detecting systems and a plurality of focus zones, at the visual field of the window of the eye piece portion. Each optical focus detecting system has a focus field corresponding to the focus zone, and each focus field is conjugate with each focus zone optically.

Figure 3:
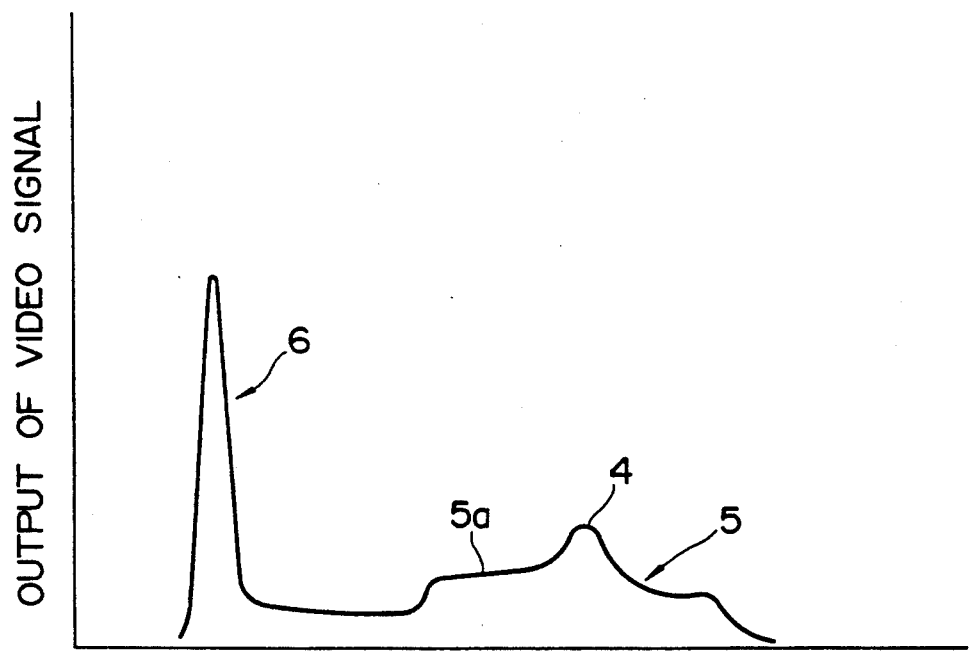
FIG. 3 is a graph of the video signal output from the line sensor.

If the axis of the lens 2 and the axis ◯ of the eye piece 11 are parallel, most of the reflection light from the lens 2 is guided to the receiving optical system 14, causing a ghost to be made on the line sensor 26, as a result, a component 6 of the ghost occurs as shown in FIG. 3.

According to the present invention most of the reflection light from the lens 2 is not guided to the receiving optical system 14. Thus, a ghost based on the reflection light from the lens 2 does not occur on the line sensor 26.

Also, the reflection light from the lens 2 does not come to the camera's main optical system, because the lens 2 closely touches the contact surface 20.

In the above-mentioned embodiment, the shape of the contact surface 20 is a concave to incline the lens 2 downward. This invention is not limited to the above mentioned embodiment.

For example, the concave is obliqued leftward or rightward in accordance with the lens 2 of the glasses. In this case, the lens 2 is inclined downward and/or rightward or leftward.

What is claimed is:

1. A view finder optical system of a camera including a window for an eye piece portion comprising an eye cup having a contact surface;
   said contact surface being made so as to conform to a lens of eyeglasses, said contact surface being shaped so as to incline an axis of said lens with respect to an axis of said eye piece portion;
   said camera has means for emitting a light beam to an eye through said eye piece portion, and means for detecting a reflected light beam from the eye.

2. A view finder optical system according to claim 1, wherein said contact surface is concave to incline the lens of the eyeglasses downwardly.

3. A view finder optical system according to claim 1, wherein said contact surface has a concave surface;
   said concave surface is directed leftwardly or rightwardly in accordance with the lens of the eyeglasses.

4. A view finder optical system of a camera including a window for an eye piece portion comprising an eye cup having a contact surface;
   said contact surface being made so as to conform to a lens of eyeglasses, said contact surface being shaped so as to incline an axis of said lens with respect to an axis of said eye piece portion;
   said camera has an eye direction detecting device, said device includes a projection optical system for projecting parallel light to an eye through said eye piece portion, and a receiving optical system including a receiving element, and said device detecting reflected light from the eye.

5. A view finder optical system according to claim 4, wherein said contact surface is curved to conform to the shape of said lens.

6. A view finder optical system according to claim 4, wherein said contact surface is concave to incline said lens.

7. An optical system including a window for an eye piece portion comprising:
   an eye cup having a contact surface, said contact surface being shaped so as to conform to a lens of eyeglasses and so that an axis of said lens is inclined with respect to an axis of said eye piece portion;
   an eye direction detecting device including a projection optical system for projecting parallel light to an eye through said eye piece portion, and a receiving optical system having a receiving element, said device detecting reflected light from the eye.

8. An optical system according to claim 7, wherein said contact surface is curved to conform to the shape of said lens.

9. An optical system according to claim 7, wherein said contact surface is concave to incline said lens.

* * * * *